(12) United States Patent
Hwang et al.

(10) Patent No.: US 9,987,747 B2
(45) Date of Patent: Jun. 5, 2018

(54) STOCKER FOR RECEIVING CASSETTES AND METHOD OF TEACHING A STOCKER ROBOT DISPOSED THEREIN

(71) Applicant: SEMES CO., LTD., Cheonan-si, Chungcheongnam-do (KR)

(72) Inventors: Gui Jin Hwang, Cheonan-si (KR); Yeon Kyu Jeong, Asan-si (KR); Young Woo Kim, Cheonan-si (KR)

(73) Assignee: SEMES CO., LTD., Cheonan-si, Chungcheongnam-Do (KR)

( * ) Notice: Subject to any disclaimer, the term of this patent is extended or adjusted under 35 U.S.C. 154(b) by 46 days.

(21) Appl. No.: 15/162,775

(22) Filed: May 24, 2016

(65) Prior Publication Data

US 2017/0341229 A1 Nov. 30, 2017

(51) Int. Cl.
*G05B 15/00* (2006.01)
*G05B 19/00* (2006.01)
*B25J 9/16* (2006.01)

(52) U.S. Cl.
CPC ............ *B25J 9/163* (2013.01); *B25J 9/1697* (2013.01); *Y10S 901/03* (2013.01)

(58) Field of Classification Search
CPC ............ B65H 2511/40; B65H 2513/42; B65H 2220/01; B65H 2220/02; B65H 2553/42; B65H 2701/18264; B65H 3/0684; H01L 21/681; H01L 21/67259; H01L 21/67778; B25J 9/1692; H05K 7/1418; H05K 7/1417
USPC ......... 700/259, 225.226, 215, 228, 229, 113, 700/115; 360/69, 71; 414/937, 940, 941
See application file for complete search history.

(56) References Cited

U.S. PATENT DOCUMENTS

| | | | | |
|---|---|---|---|---|
| 4,742,405 | A | * | 5/1988 | Teranishi ............... G11B 17/24 360/137 |
| 4,864,511 | A | * | 9/1989 | Moy ..................... G06F 3/0601 242/335 |
| 5,038,235 | A | * | 8/1991 | Ohzawa ............ G11B 23/0236 206/387.15 |
| 5,182,687 | A | * | 1/1993 | Campbell ............ G11B 15/681 360/71 |
| 5,197,632 | A | * | 3/1993 | Kaufman .............. A61J 7/0084 221/197 |
| 5,628,604 | A | * | 5/1997 | Murata ............. H01L 21/67769 414/283 |
| 5,699,262 | A | * | 12/1997 | Lang ....................... G07F 7/069 194/906 |
| 5,981,966 | A | * | 11/1999 | Honma ............. H01L 21/67778 250/559.33 |
| 6,060,721 | A | * | 5/2000 | Huang ............. H01L 21/67259 250/559.33 |
| 6,129,496 | A | * | 10/2000 | Iwasaki ............. H01L 21/67276 414/222.01 |

(Continued)

*Primary Examiner* — Khoi H Tran
*Assistant Examiner* — Jorge O Peche
(74) *Attorney, Agent, or Firm* — Kile Park Reed & Houtteman PLLC (57) ABSTRACT

Disclosed is a stocker for receiving a cassette. The stocker includes a shelf for receiving a cassette, a stocker robot, a teaching jig, and a teaching unit. The stocker robot includes a robot arm configured to load the cassette in the shelf and to unload the cassette from the shelf. The teaching jig is disposed in the shelf to teach the stocker robot. The teaching unit is disposed on the robot arm to acquire information for teaching the stocker robot using the teaching jig.

16 Claims, 5 Drawing Sheets

(56) References Cited

U.S. PATENT DOCUMENTS

| | | | | |
|---|---|---|---|---|
| 6,136,614 A * | 10/2000 | Funk | H01L 21/67276 | 438/14 |
| 6,176,392 B1 * | 1/2001 | William | G07F 11/165 | 221/107 |
| 6,199,720 B1 * | 3/2001 | Rudick | G07F 11/08 | 221/13 |
| 6,393,337 B1 * | 5/2002 | Perlov | H01L 21/681 | 414/757 |
| 6,520,727 B1 * | 2/2003 | Babbs | H01L 21/67271 | 414/217 |
| 6,540,467 B1 * | 4/2003 | Zohni | H01L 21/6732 | 206/710 |
| 6,582,182 B2 * | 6/2003 | Whalen | H01L 21/67769 | 414/276 |
| 6,671,574 B1 * | 12/2003 | Hashimoto | G05B 19/402 | 356/124 |
| 6,707,528 B1 * | 3/2004 | Aoyama | G03B 27/42 | 355/18 |
| 6,919,913 B1 * | 7/2005 | Inada | H01L 21/67259 | 348/61 |
| 7,139,640 B2 * | 11/2006 | Chae | H01L 21/67276 | 700/226 |
| 7,206,663 B2 * | 4/2007 | Teng | H01L 21/67265 | 700/218 |
| 7,329,079 B2 * | 2/2008 | Ohkawara | H01L 21/681 | 414/217 |
| 7,456,977 B2 * | 11/2008 | Ramsey | H01L 21/67259 | 348/94 |
| 7,696,897 B2 * | 4/2010 | Horii | G03B 21/13 | 340/5.91 |
| 8,529,314 B2 * | 9/2013 | Segawa | H01L 21/67092 | 414/805 |
| 2001/0002447 A1 * | 5/2001 | Kawamatsu | B25J 19/025 | 700/229 |
| 2002/0033449 A1 * | 3/2002 | Nakasuji | G01N 23/225 | 250/306 |
| 2003/0069664 A1 * | 4/2003 | Caspary | B07C 5/3412 | 700/215 |
| 2003/0077153 A1 * | 4/2003 | Elliott | H01L 21/67294 | 414/281 |
| 2003/0091409 A1 * | 5/2003 | Danna | H01L 21/67736 | 414/217 |
| 2003/0139852 A1 * | 7/2003 | Kataoka | H01L 21/67259 | 700/258 |
| 2003/0186563 A1 * | 10/2003 | Kobayashi | H01L 21/324 | 438/795 |
| 2004/0128023 A1 * | 7/2004 | Chae | H01L 21/67276 | 700/214 |
| 2004/0172164 A1 * | 9/2004 | Habibi | B25J 9/1692 | 700/245 |
| 2005/0034288 A1 * | 2/2005 | Adachi | H01L 21/67259 | 29/25.01 |
| 2005/0045821 A1 * | 3/2005 | Noji | G01N 23/225 | 250/311 |
| 2005/0268987 A1 * | 12/2005 | Rackers | G01N 35/109 | 141/130 |
| 2005/0273199 A1 * | 12/2005 | Ban | B25J 9/1682 | 700/248 |
| 2006/0047363 A1 * | 3/2006 | Farrelly | G01N 35/00722 | 700/245 |
| 2006/0100740 A1 * | 5/2006 | Sakiya | B25J 9/1692 | 700/246 |
| 2006/0106497 A1 * | 5/2006 | Ishikawa | B25J 9/1697 | 700/259 |
| 2007/0189596 A1 * | 8/2007 | Lee | H01L 21/681 | 382/151 |
| 2010/0282956 A1 * | 11/2010 | Kimba | H01J 37/28 | 250/252.1 |
| 2011/0050882 A1 * | 3/2011 | Lee | G06K 9/3208 | 348/95 |
| 2011/0130864 A1 * | 6/2011 | Hirota | B25J 9/1692 | 700/213 |
| 2011/0137454 A1 * | 6/2011 | Ohashi | H01L 21/67766 | 700/228 |
| 2012/0197438 A1 * | 8/2012 | Ogami | B25J 9/1682 | 700/258 |
| 2013/0255283 A1 * | 10/2013 | Berchowitz | F25D 11/00 | 62/63 |
| 2014/0222202 A1 * | 8/2014 | Yoshida | B25J 9/163 | 700/258 |
| 2014/0277722 A1 * | 9/2014 | Nagai | B25J 9/1692 | 700/254 |
| 2014/0312227 A1 * | 10/2014 | Yoshikawa | G01N 23/2204 | 250/310 |
| 2015/0287570 A1 * | 10/2015 | Hayashi | H01J 37/222 | 250/310 |
| 2016/0035607 A1 * | 2/2016 | Lee | H01L 21/67294 | 414/304 |
| 2016/0125583 A1 * | 5/2016 | Amanullah | G06T 7/001 | 348/87 |
| 2016/0167227 A1 * | 6/2016 | Wellman | B25J 9/1612 | 700/259 |
| 2016/0325430 A1 * | 11/2016 | Yoshida | H01L 21/67766 | |
| 2017/0001814 A1 * | 1/2017 | Kim | B65G 49/061 | |
| 2017/0106533 A1 * | 4/2017 | Minami | B25J 9/042 | |
| 2017/0158430 A1 * | 6/2017 | Raizer | B65G 1/137 | |
| 2018/0057263 A1 * | 3/2018 | Beer | B65G 1/137 | |

* cited by examiner

STOCKER FOR RECEIVING CASSETTES AND METHOD OF TEACHING A STOCKER ROBOT DISPOSED THEREIN

BACKGROUND

1. Technical Field

Example embodiments relate generally to a stocker for receiving cassettes and a method of teaching a stocker robot disposed therein. More particularly, embodiments of the inventive concept relate to a stocker having shelves to receive cassettes in which semiconductor substrates or glass substrates are received, and a method of teaching a stocker robot disposed therein to transport the cassettes.

2. Description of the Related Art

In a method of manufacturing a semiconductor device or a display device, cassettes in which semiconductor substrates or glass substrates are received is stored in a stocker, and the stocker includes a plurality of shelves for receiving the cassettes.

The shelves are arranged in horizontal and vertical directions, and a stocker robot for transporting the cassettes is disposed in the stocker. The stocker robot is movable in the horizontal and vertical directions, and includes a robot arm for transporting the cassette.

The stocker robot is moved in a first horizontal direction and a vertical direction using a predetermined first position coordinate to receive the cassette in the shelf, and the robot arm is moved in a second horizontal direction substantially perpendicular to the first horizontal direction using a predetermined second position coordinate.

The position coordinates are predetermined using design data of the stocker. However, the position coordinates may be different from real coordinates, and thus, a teaching operation for the position coordinates is required. The teaching operation is manually performed by a worker, but a lot of time is required. Thus, improvement for the above problem is required.

SUMMARY

Some example embodiments provide a stocker capable of easily performing a teaching operation of a stocker robot for receiving a cassette in a shelf. Also, some example embodiments also provide a method of rapidly and easily teaching the stocker robot.

According to some example embodiments, a stocker for receiving a cassette may include a shelf for receiving a cassette, a stocker robot, a teaching jig, and a teaching unit. The stocker robot may include a robot arm configured to load the cassette in the shelf and to unload the cassette from the shelf. The teaching jig may be disposed in the shelf to teach the stocker robot. The teaching unit may be disposed on the robot arm to acquire information for teaching the stocker robot using the teaching jig.

In example embodiments, the teaching jig may include a type of matrix barcode (a two-dimensional code), such as a Quick Reference (QR) code which has fast readability and large storage capacity when compared to standard UPC barcodes. A QR code consists of black modules (square dots) arranged in a square pattern on a white background and is detected as a two-dimensional digital image by a semiconductor image sensor and is then digitally analyzed by a programmed processor, and the teaching unit may include a QR scanner for identifying the QR code.

In example embodiments, the stocker may further include a controller performing teaching of the stocker robot using the information acquired by the teaching unit.

In example embodiments, the teaching unit may acquire a teaching jig image, and the controller may acquire an image coordinate corresponding to an edge of the teaching jig from the teaching jig image, compare the acquired image coordinate with a predetermined image coordinate, and perform the teaching of the stocker robot using a difference value between the acquired image coordinate and the predetermined image coordinate.

In example embodiments, the teaching jig may be disposed on an inner wall of the shelf to face the robot arm.

In example embodiments, the stocker may further include a second teaching jig disposed in the shelf to teach the robot arm, and a second teaching unit disposed on the robot arm to perform the teaching of the robot arm using the second teaching jig.

In example embodiments, the second teaching unit may include a laser displacement sensor for measuring a distance to the second teaching jig.

In example embodiments, the second teaching unit may include a scale cylinder for measuring a distance to the second teaching jig.

According to some example embodiments, a method of teaching a stocker robot is provided. The stocker robot may be moved to a front position of a shelf for receiving a cassette using a predetermined position coordinate. Information for teaching the stocker robot may be acquired from a teaching jig disposed in the shelf using a teaching unit disposed on a robot arm of the stocker robot. The predetermined position coordinate may be compensated using the acquired information.

In example embodiments, the teaching jig may include a QR code, and the teaching unit may include a QR scanner configured to identify the QR code.

In example embodiments, the information may be acquired by acquiring a teaching jig image using the teaching unit, acquiring an image coordinate corresponding to an edge of the teaching jig from the teaching jig image, and comparing the acquired image coordinate with a predetermined image coordinate to calculate a difference value between the acquired image coordinate and the predetermined image coordinate.

In example embodiments, the method may further include moving the stocker robot using the compensated position coordinate.

In example embodiments, the method further include moving the robot arm into the shelf using a predetermined second position coordinate, measuring a distance to a second teaching jig disposed in the shelf using a second teaching unit disposed on the robot arm, comparing the measured distance with a predetermined distance to calculate a difference value, and compensating the second position coordinate using the difference value.

In example embodiments, the stocker robot may be moved in a first horizontal direction and a vertical direction, and the robot arm may be moved in a second horizontal direction substantially perpendicular to the first horizontal direction.

According to the example embodiments of the present invention, a teaching jig disposed in a shelf may be identified using a teaching unit disposed on a robot arm, and teaching of a stocker robot may be performed using information acquired from the teaching jig. In particular, shelf number may be checked using a QR code prepared on the teaching jig, and an image coordinate corresponding to a edge portion of the teaching jig from a teaching jig image acquired by the teaching unit. A controller may compare the acquired image coordinate with a predetermined image coordinate, and may compensate a position coordinate, for example, an X-axis coordinate and a Z-axis coordinate, of the stocker robot using a difference value between the acquired image coordinate with a predetermined image coordinate.

Also, a distance to a second teaching jig disposed in the shelf may be measured using a second teaching unit disposed on the robot arm, and a second position coordinate, for example, a Y-axis coordinate, of the robot arm may be compensated using the measured distance.

The X-axis coordinate and the Z-axis coordinate are compensated by using the teaching jig and the teaching unit and the Y-axis coordinate is compensated by using the second teaching jig and the second teaching unit, and thus, the teaching operation of the stocker robot may be more simplified, and the time required to the teaching operation of the stocker robot may be greatly decreased.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Various example embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity. Like numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). It will be understood that, although the terms first, second, third etc. may be used herein to describe various elements, these elements should not be limited by these terms. These terms are used to distinguish one element from another. Thus, a first element discussed below could be termed a second element without departing from the teachings of the present inventive concept. As used herein, the term "and/or" includes any and all combinations of one or more of the associated listed items.

The terminology used herein is for the purpose of describing particular example embodiments only and is not intended to be limiting of the present inventive concept. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a charge collecting plate for a fuel cell and a stack structure having the same according to embodiments of the present invention will be described in detail with reference to enclosed drawings. It is important to understand that the present invention may be embodied in many alternative forms and should not be construed as limited to the example embodiments set forth herein. While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. In describing each drawing, like numerals are used for like elements. In the enclosed drawings, the sizes and relative sizes of layers and regions may be exaggerated for clarity. Like numerals refer to like elements throughout.

Figure 1:
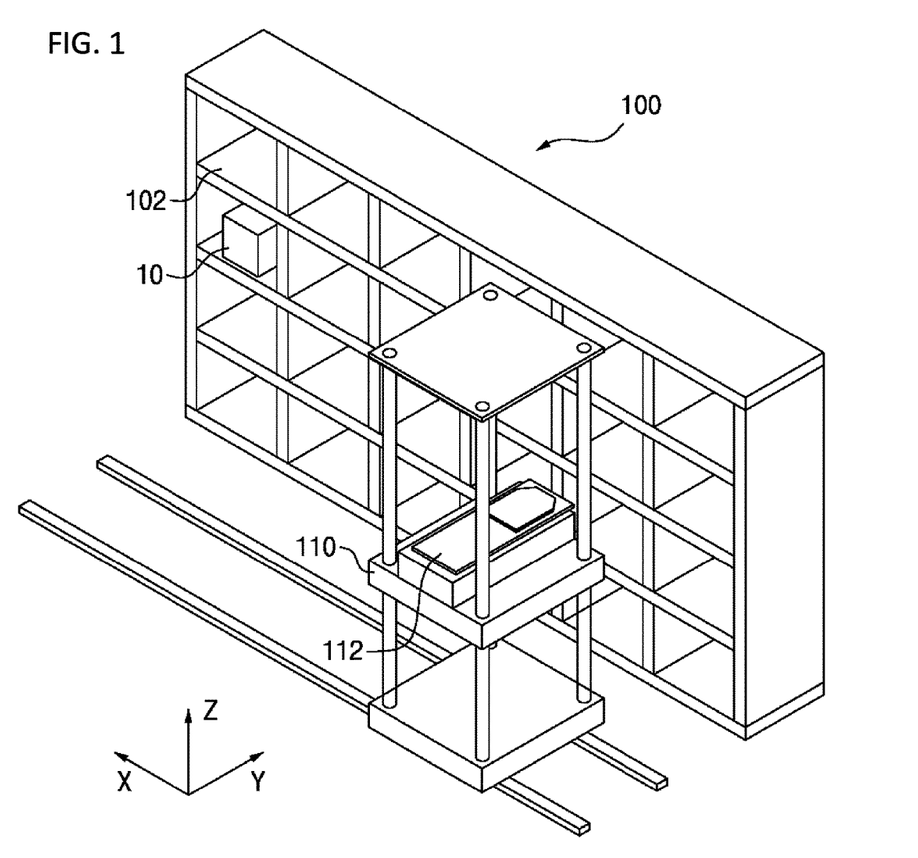
FIG. 1 is a schematic view illustrating a stocker according to an embodiment of the present invention.
Figure 2:
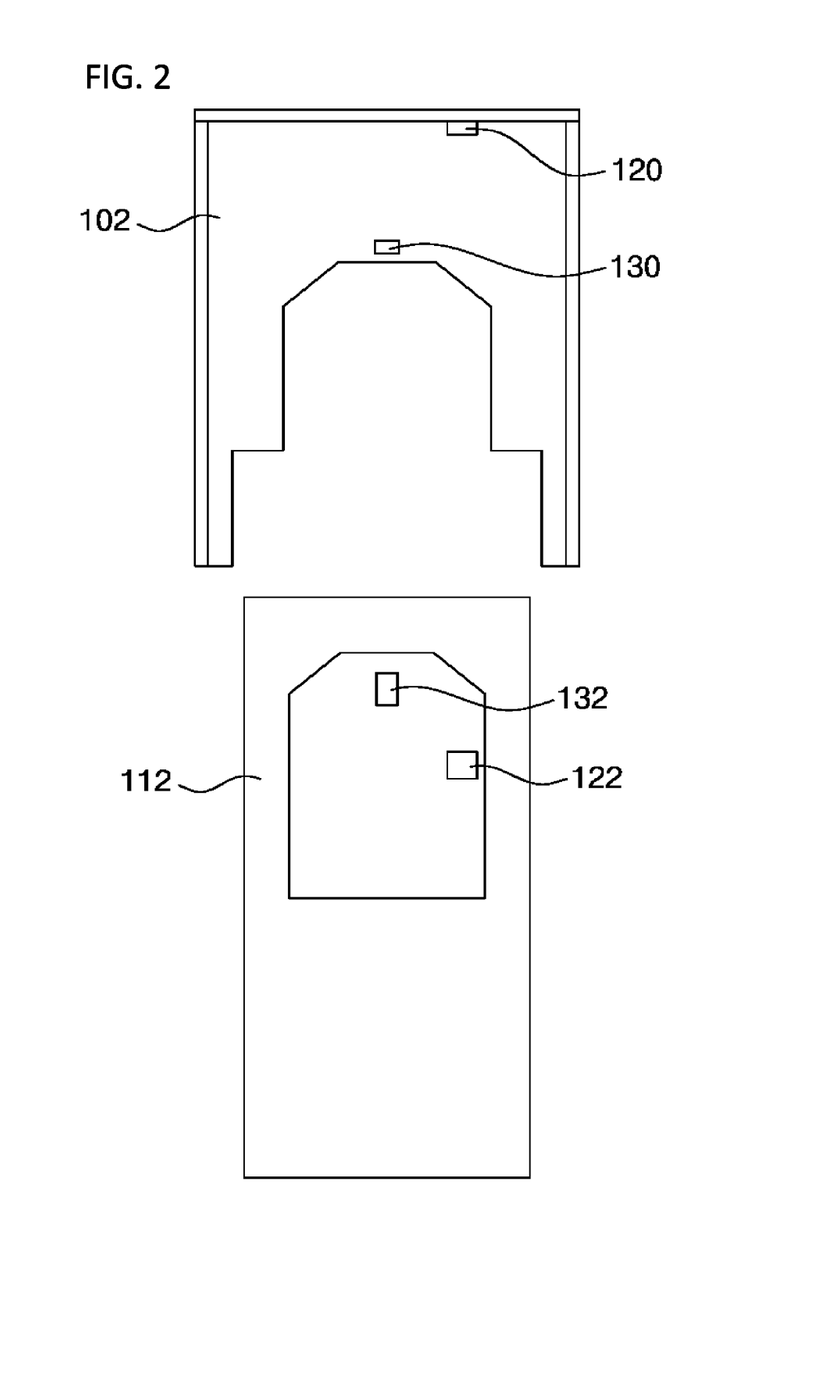
FIG. 2 is a plan view illustrating a shelf and a robot arm as shown in FIG. 1.

FIG. 1 is a schematic view illustrating a stocker according to an embodiment of the present invention, and FIG. 2 is a plan view illustrating a shelf and a robot arm as shown in FIG. 1.

Referring to FIG. 1, a stocker 100 according to an embodiment of the present invention may be used to receive cassettes 10 for receiving semiconductor substrates or glass substrates in a process of manufacturing a semiconductor device or a display device.

The stocker 100 may include a plurality of shelves 102 for receiving the cassettes 10. The shelves 102 may be arranged in a first horizontal direction (an X-axis direction) and a vertical direction (a Z-axis direction), and a stocker robot 110 for transporting the cassettes 10 may be disposed in front of the shelves 102.

The stocker robot 110 may be configured to be movable in a first horizontal direction and a vertical direction to transport the cassettes 10. Although not shown in FIG. 1, the stocker robot 110 may be guided by guide rails extended in the first horizontal direction and guide rails extended in the vertical direction. Further, the stocker 100 may include a first horizontal driving part (not shown) for moving the stocker robot 110 in the first horizontal direction and a vertical driving part (not shown) for moving the stocker robot 110 in the vertical direction.

The stocker robot 110 may include a robot arm 112 for transferring the cassettes 10, and the robot arm 112 may be configured to be movable toward the shelves 1102. For example, the robot arm 112 may be configured to be movable in a second horizontal direction (a Y-axis direction) substantially perpendicular to the first horizontal direction, and the stocker robot 110 may include a second horizontal driving part (not shown) for driving the robot arm 112.

For example, the first and second horizontal driving parts and the vertical driving part may be configured by using a motor, a timing belt, pulleys, etc.

Referring to FIG. 2, a teaching jig 120 for teaching the stocker robot 110 may be prepared in the shelf 102. For example, the teaching jig 120 may be disposed on an inner wall of the shelf 102 to face the robot arm 112.

A teaching unit 112 for teaching the stocker robot 110 using the teaching jig 120 may be disposed on the robot arm 112. For example, the teaching unit 112 may be configured to identify the teaching jig 120 and acquire information for teaching the stocker robot 110 using the teaching jig 120.

Although not shown in FIG. 2, according to the embodiment of the present invention, the teaching jig 120 may include a type of matrix barcode (a two-dimensional code), such as a Quick Reference (QR) code, and the teaching unit 122 may include a QR scanner for identifying the QR code. For example, the QR code may include information of number indicating a position of the shelf 102, etc.

Also, the stocker 100 may include a controller (not shown) performing teaching of the stocker robot 110 using the information acquired by the teaching unit 122. For example, the teaching unit 122 may acquire the teaching jig image 20 (shown in FIG. 3). The controller may acquire an image coordinate corresponding to an edge of the teaching jig 120 from the teaching jig image 20 and may compare the acquired image coordinate with a predetermined image coordinate, and thus, a real position of the stocker robot 110 may be detected. Then, the controller may perform the teaching of the stocker robot 110 using a difference value between the acquired image coordinate and the predetermined image coordinate.

Figure 3:
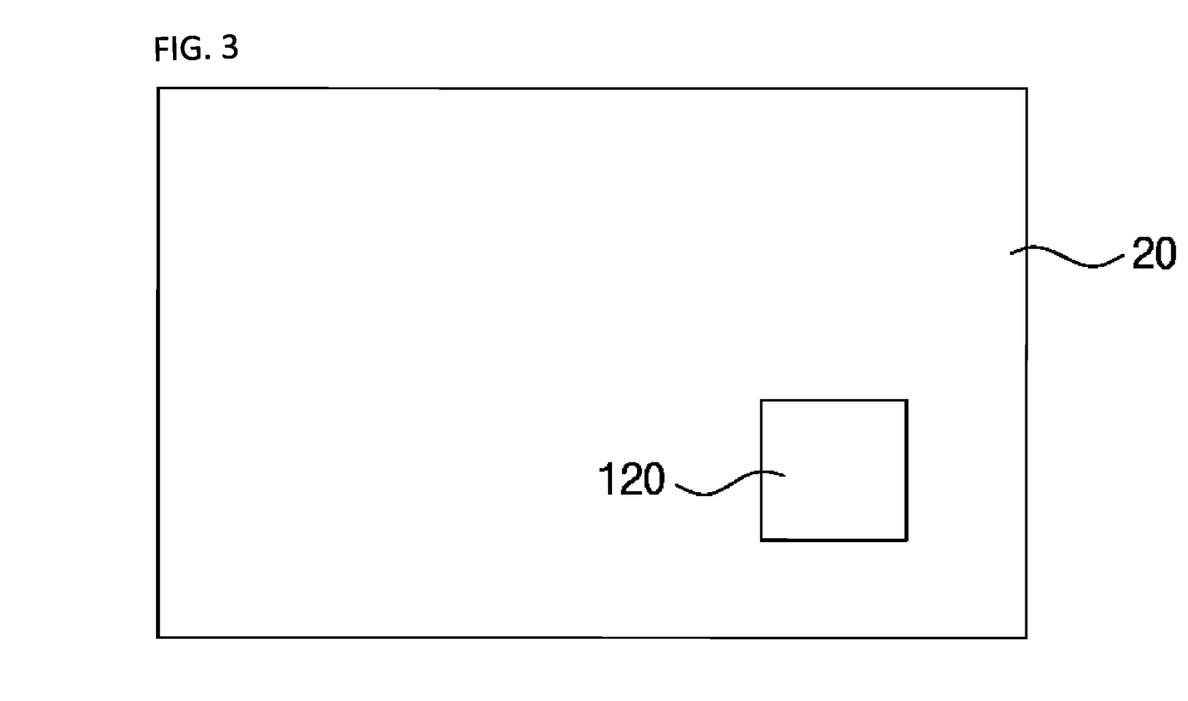
FIGS. 3 and 4 are schematic views illustrating a teaching jig image acquired by a teaching unit as shown in FIG. 2.
Figure 4:
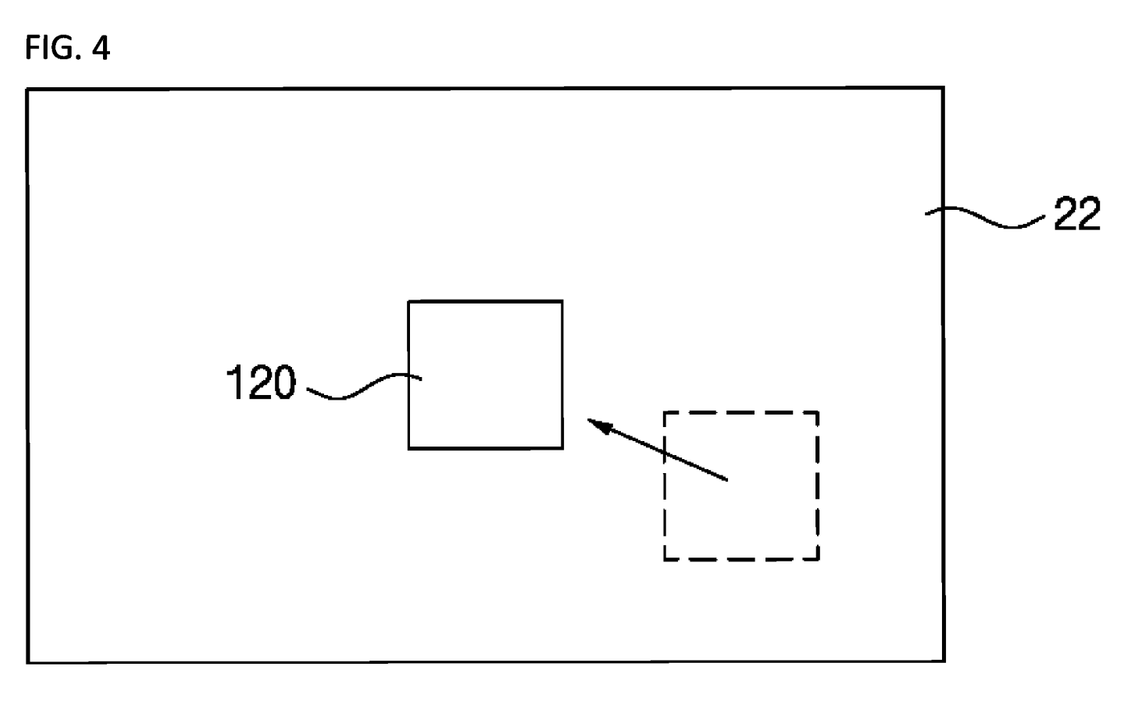

FIGS. 3 and 4 are schematic views illustrating a teaching jig image acquired by a teaching unit as shown in FIG. 2.

As shown in FIG. 3, the stocker robot 110 may be moved to a front position of one of the shelves 102 using the predetermined position coordinate, and the teaching unit 122 may then acquire an image 20 of the teaching jig 120. The controller may acquire image coordinates of the edges of the teaching jig 120 from the teaching jig image 20. Further, the controller may compare the acquired image coordinates with the predetermined image coordinates to calculate difference values therebetween, and may compensate the position coordinate of the stocker robot 110 using the difference values.

Then, the controller may move the stocker robot 110 to the compensated position coordinate, and may check the compensation of the position coordinate of the stocker robot 110 using the teaching unit 122. That is, as shown in FIG. 4, after the stocker robot 110 is moved to the compensated position coordinate, when the teaching jig 120 is positioned at a desired position, for example, a central portion of the second teaching jig image 22 in the second teaching jig image 22, the stocker robot 110 is determined to be rightly taught. In particular, when the difference values between the image coordinates corresponding to the edge portions of the teaching jig 120 and the predetermined image coordinates are within a predetermined tolerance range, the teaching operation of the stocker robot 110 is determined to be successfully performed.

Referring again to FIG. 2, a second teaching jig 130 for teaching the robot arm 112 may be disposed in the shelf 102, and a second teaching unit 132 for performing teaching of the robot arm 112 using the second teaching jig 130 may be disposed on the robot arm 112. In particular, the second teaching jig 130 may be used to teach a moving distance of the robot arm 112 in the second horizontal direction, that is, a Y-axis coordinate.

For example, the second teaching unit 132 may include a laser displacement sensor to measure the distance to the second teaching jig 130. Alternatively, the second teaching unit 132 may include a scale cylinder to measure the distance to the second teaching jig 130.

Figure 5:
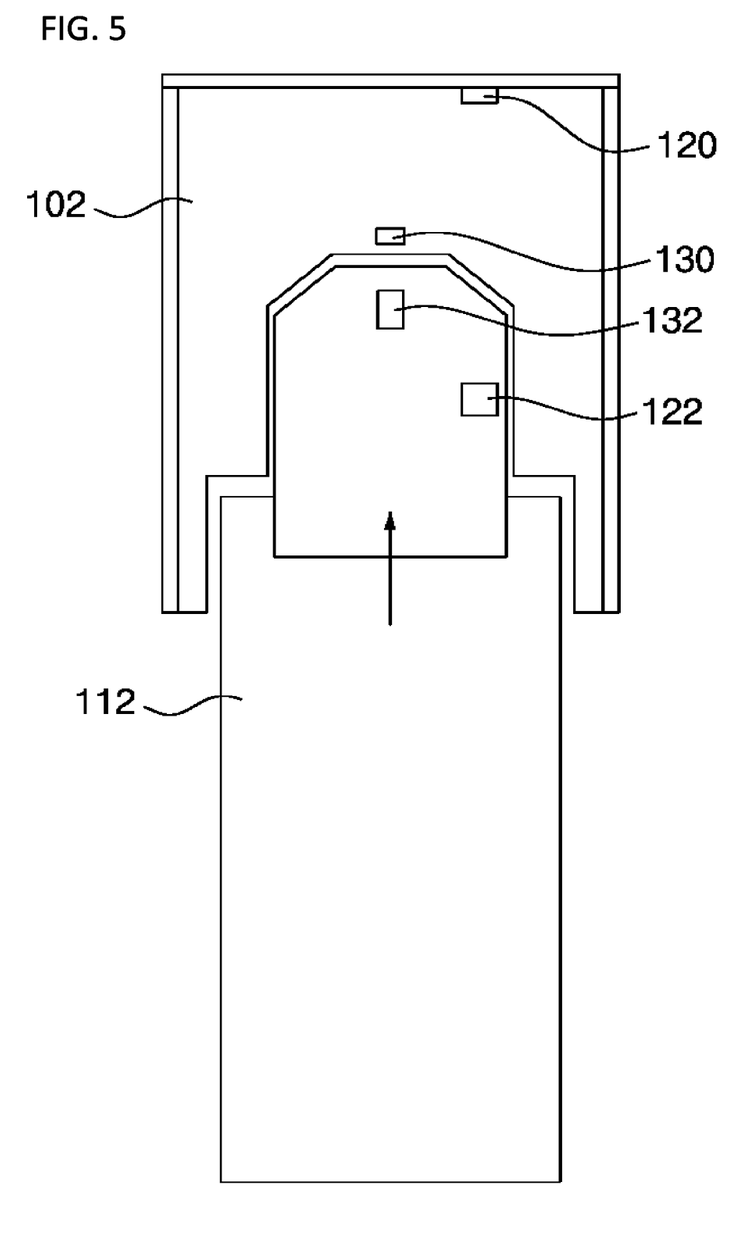
FIG. 5 is a plan view illustrating a teaching operation of the robot arm as shown in FIG. 2.

FIG. 5 is a plan view illustrating a teaching operation of the robot arm as shown in FIG. 2.

Referring to FIG. 5, after the teaching operation of the stocker robot 110 is completed, the controller may move the robot arm 112 in the second horizontal direction. In particular, the controller may move the robot arm 112 into the shelf 102 using the predetermined second position coordinate. The second position coordinate may be a position coordinate for loading the cassette 10 on the shelf 102 and unloading the cassette 10 from the shelf 102.

The second teaching unit 132 may measure a distance to the second teaching jig 130, and the controller may compare the measured distance with a predetermined distance to calculate a difference value therebetween, and may compensate the second position coordinate using the difference value.

Hereinafter, a method of teaching the stocker robot according to one embodiment of the present invention will be explained in detail with reference to the accompanying drawings.

The controller may move the stocker robot 110 to a front position of one among the shelves 102 using the predetermined position coordinate. For example, the stocker robot 110 may be moved in the first horizontal direction (the X-axis direction) and the vertical direction (the Z-axis direction).

Then, the teaching jig 120 disposed in the shelf 102 may be identified by the teaching unit 122 disposed on the robot arm 112. For example, as shown in FIG. 3, the teaching jig image 20 may be acquired by the teaching unit 122, and the controller may acquire image coordinates corresponding to the edges of the teaching jig 120 from the teaching jig image 20. Also, the controller may check the number of the shelf 102 from the QR code, and may check whether the stocker robot 110 is normally moved to the desired position or not.

Then, the controller may compare the acquired image coordinates with the predetermined image coordinates to calculate the real position of the stocker robot 110. For example, a mean value of the difference values between the acquired image coordinates with the predetermined image coordinates may be calculated, and the mean value may correspond to the difference value between the predetermined position coordinate and the real coordinate of the stocker robot 110.

The controller may compensate the predetermined position coordinate, for example, the X-axis coordinate and the Z-axis coordinate using the difference value, and then, may move the stocker robot 110 to the compensated position coordinate.

After the stocker robot 110 is moved to the compensated position coordinate, the teaching unit 122 may acquire a second teaching jig image 22, and the controller may determine whether the teaching of the stocker robot 110 is successfully performed using the second teaching jig image 22. When the compensation is normally performed, for example, the teaching jig 120 may be displayed on a central portion of the second teaching jig image 22 as shown in FIG. 4.

After the teaching operation for the X-axis coordinate and the Z-axis coordinate of the stocker robot 110 is performed, the controller may move the robot arm 112 in the second horizontal direction, for example, the Y-axis direction. In particular, the controller, as shown in FIG. 5, may move the robot arm 112 toward the inside of the shelf 102 using the predetermined second position coordinate.

After the robot arm 112 is moved to the second position coordinate, the second teaching unit 132 may measure a distance to the second teaching jig 130, and the controller may compare the measured distance with the predetermined distance to calculate a difference value. Then, the controller may compensate the second position coordinate, for example, the Y-axis coordinate using the difference value.

As described above, according to the example embodiments of the present invention, the teaching jig 120 disposed in the shelf 102 may be identified using the teaching unit 122 disposed on the robot arm 112, and the teaching of a stocker robot 110 may be performed using the information acquired from the teaching jig 120. In particular, the number of the shelf 102 may be checked using the QR code prepared on the teaching jig 120, and the image coordinate corresponding to the edge portion of the teaching jig 120 may be acquired from the teaching jig image 20 acquired by the teaching unit 122. The controller may compare the acquired image coordinate with the predetermined image coordinate, and may compensate the position coordinate, for example, the X-axis coordinate and the Z-axis coordinate of the stocker robot 110 using the difference value.

Also, the distance to the second teaching jig 130 in the shelf 102 may be measured using the second teaching unit 132 disposed on the robot arm 112, and the second position coordinate, for example, the Y-axis coordinate of the robot arm 112 may be compensated using the measured distance.

As described above, the X-axis coordinate and the Z-axis coordinate may be compensated using the teaching jig 120 and the teaching unit 122, and the Y-axis coordinate may be compensated using the second teaching jig 130 and the second teaching unit 132, and thus, the teaching operation of the stocker robot 110 may be more simplified, and the time required to the teaching operation of the stocker robot 110 may be greatly decreased.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A stocker for receiving a cassette comprising:
   a shelf configured to receive a cassette;
   a stocker robot including a robot arm configured to load the cassette in the shelf and to unload the cassette from the shelf;
   a teaching jig disposed in the shelf configured to teach the stocker robot;
   a teaching unit disposed on the robot arm configured to identify the teaching jig and to acquire information for teaching the stocker robot using the identified teaching jig; and
   a second teaching jig disposed in the shelf configured to teach the robot arm.

2. The stocker of claim 1, wherein the teaching jig comprises a quick reference (QR) code.

3. The stocker of claim 2, wherein the teaching unit comprises a QR scanner for identifying the QR code.

4. The stocker of claim 1, further comprising a controller configured to perform teaching of the stocker robot using the information acquired by the teaching unit.

5. The stocker of claim 4, wherein the teaching unit acquires a teaching jig image, and the controller acquires an image coordinate corresponding to an edge of the teaching jig from the teaching jig image, compares the acquired image coordinate with a predetermined image coordinate, and performs teaching of the stocker robot using a difference value between the acquired image coordinate and the predetermined image coordinate.

6. The stocker of claim 1, wherein the teaching jig is disposed on an inner wall of the shelf to face the robot arm.

7. The stocker of claim 1, further comprising:
   a second teaching unit disposed on the robot arm configured to perform the teaching of the robot arm using the second teaching jig.

8. The stocker of claim 7, wherein the second teaching unit comprises a laser displacement sensor for measuring a distance to the second teaching jig.

9. The stocker of claim 7, wherein the second teaching unit comprises a scale cylinder for measuring a distance to the second teaching jig.

10. A method of teaching a stocker robot, comprising:
    moving the stocker robot to a front position of a shelf for receiving a cassette using a predetermined position coordinate;
    acquiring information for teaching the stocker robot from a teaching jig disposed in the shelf using a teaching unit disposed on a robot arm of the stocker robot;
    compensating the predetermined position coordinate using the acquired information;
    moving the robot arm into the shelf using a predetermined second position coordinate; and
    measuring a distance to a second teaching jig disposed in the shelf using a second teaching unit disposed on the robot arm.

11. The method of claim 10, wherein the teaching jig comprises a quick reference (QR) code.

12. The method of claim 11, wherein the teaching unit comprises a QR scanner configured to identify the QR code.

13. The method of claim 10, wherein the information is acquired by:
    acquiring a teaching jig image using the teaching unit;
    acquiring an image coordinate corresponding to an edge of the teaching jig from the teaching jig image; and
    comparing the acquired image coordinate with a predetermined image coordinate to calculate a difference value between the acquired image coordinate and the predetermined image coordinate.

14. The method of claim 10, further comprising moving the stocker robot using the compensated position coordinate.

15. The method of claim 14, further comprising:
comparing the measured distance with a predetermined distance to calculate a difference value; and
compensating the second position coordinate using the difference value.

16. The method of claim 15, wherein the stocker robot is moved in a first horizontal direction and a vertical direction, and the robot arm is moved in a second horizontal direction perpendicular to the first horizontal direction.

* * * * *